US012752640B2

(12) United States Patent
Bindl et al.

(10) Patent No.: US 12,752,640 B2
(45) Date of Patent: Oct. 6, 2026

(54) CONTROL SYSTEM FOR A HYBRID VEHICLE WITH A DUAL VOLTAGE DIRECT CURRENT BUS

(71) Applicant: Deere & Company, Moline, IL (US)

(72) Inventors: Reginald M. Bindl, Bettendorf, IA (US); Andrew W. Kelly, Holy Cross, IA (US)

(73) Assignee: Deere & Company, Moline, IL (US)

( * ) Notice: Subject to any disclaimer, the term of this patent is extended or adjusted under 35 U.S.C. 154(b) by 277 days.

(21) Appl. No.: 18/679,551

(22) Filed: May 31, 2024

(65) Prior Publication Data

US 2025/0269740 A1 Aug. 28, 2025

Related U.S. Application Data

(60) Provisional application No. 63/559,035, filed on Feb. 28, 2024.

(51) Int. Cl.
*B60L 50/61* (2019.01)
*B60L 50/16* (2019.01)
*B60L 50/51* (2019.01)

(52) U.S. Cl.
CPC ............... *B60L 50/61* (2019.02); *B60L 50/16* (2019.02); *B60L 50/51* (2019.02); *B60L 2210/42* (2013.01)

(58) Field of Classification Search
CPC .......... B60L 50/16; B60L 50/51; B60L 50/61; B60L 2210/42
See application file for complete search history.

(56) References Cited

U.S. PATENT DOCUMENTS

| | | | | |
|---|---|---|---|---|
| 8,772,954 | B1 | 7/2014 | Barngrover | |
| 8,880,250 | B2 | 11/2014 | Wu et al. | |
| 10,836,259 | B2 * | 11/2020 | Awad Alla | B60L 3/00 |
| 11,418,130 | B2 | 8/2022 | Li et al. | |
| 2008/0234087 | A1 * | 9/2008 | Besnard | B60L 50/16 475/5 |
| 2008/0315817 | A1 * | 12/2008 | Yonemori | B60W 20/00 318/476 |
| 2015/0210171 | A1 * | 7/2015 | King | B60L 58/20 29/825 |
| 2016/0023555 | A1 | 1/2016 | Namuduri et al. | |
| 2020/0398680 | A1 | 12/2020 | Du et al. | |

FOREIGN PATENT DOCUMENTS

| | | | |
|---|---|---|---|
| EP | 3613625 | A2 | 2/2020 |
| WO | WO 2022132807 | A1 | 6/2022 |

OTHER PUBLICATIONS

Extended European Search Report and Written Opinion issued in European Patent Application No. 24218466.1 dated Jun. 23, 2025, in 17 pages.

* cited by examiner

*Primary Examiner* — Edwin A Young

(57) ABSTRACT

During a normal DC bus mode, the first DC node and the second DC node are configured to operate a lower voltage level on the primary direct current bus. In contrast, during a boost DC mode, the first DC node and the second DC node configured to operate a higher voltage level, which is higher than the lower voltage level, on the primary direct current bus.

20 Claims, 5 Drawing Sheets

CONTROL SYSTEM FOR A HYBRID VEHICLE WITH A DUAL VOLTAGE DIRECT CURRENT BUS

RELATED APPLICATION

This document (including the drawings) claims priority and the benefit of the filing date based on U.S. provisional application No. 63/559,035, filed Feb. 28, 2024, under 35 U.S.C. § 119(e), where the provisional application is hereby incorporated by reference herein.

FIELD

This disclosure relates to a control system for a hybrid vehicle with dual voltage direct current bus.

BACKGROUND

In some prior art, hybrid off-road vehicles may support implements for agricultural, mowing, construction or other work tasks, where the implements may be associated with variable electrical loads from electric motors, among other things. Further, in certain prior art, the hybrid off-road vehicle typically has a direct current (DC) bus that operates at a fixed, regulated voltage, where an inverter can convert the available DC energy of the DC bus to alternating current energy for application to one or more variable electrical loads. The fixed DC bus voltage may limit the alternating current energy that is available to the variable electrical load or loads to adjust to dynamic changes in one or more electrical loads. Therefore, there is need for a hybrid vehicle with a dual voltage direct current bus.

SUMMARY

In accordance with one embodiment, a first inverter comprises a first alternating current node and a first direct current node, wherein the first alternating current node is coupled to a primary electric machine and wherein the first direct current (DC) node is coupled to a primary direct current bus. A second inverter comprises a second alternating current node and a second direct current (DC) node, wherein the second alternating current node is coupled to an electrical load and wherein the second direct current node is coupled to the primary direct current bus.

During a normal DC bus mode, the first DC node and the second DC node are configured to operate a lower voltage level on the primary direct current bus. In contrast, during a boost DC mode, the first DC node and the second DC node configured to operate a higher voltage level, which is higher than the lower voltage level, on the primary direct current bus.

A rectifier is coupled between electrical terminals of a secondary electric machine and a secondary DC bus. An isolation switch has switched terminals connected between the primary DC bus and the secondary DC bus. A sensor is coupled to the second alternating current node to detect an observed current draw or an observed power consumption of the electrical load or loads during one or more sampling intervals.

In accordance with one aspect of the disclosure, a vehicle controller or an electronic data processor is configured: (a) to change the switched terminals of the isolation switch (from a closed state) to an open state and (b) to generate a control signal for the inverters to operate in the DC boost mode if the electronic data processor determines that the detected current draw exceeds a threshold current or that the detected power consumption exceeds a threshold power during one or more sampling intervals.

In accordance with another aspect of the disclosure, a vehicle controller or an electronic data processor is configured: (a) to change the switched terminals of the isolation switch to an open state (from a closed state) and (b) to generate a control signal for the inverters to operate in the DC boost mode if the electronic data processor determines that the operator of the vehicle entered or selected, via the user interface, an application rate or aggregate flow rate for a sprayer implement that exceeds a threshold application rate or threshold flow rate.

DETAILED DESCRIPTION

In any of the above referenced drawings of this document, any arrow or line that connects any blocks, components, modules, multiplexers, memory, data storage, sensors, integrators, filters, accumulators, data processors, electronic components, inverters, converters, rectifiers, switches, semiconductors, capacitors, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system and method in which one or more electronic data processors process, store, retrieve, and otherwise manipulate data via data buses and one or more data storage devices (e.g., accumulators or memory) as described in this document and the accompanying drawings. As used in this document, “configured to, adapted to, or arranged to” mean that the electronic data processor or system is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, “configured to, adapted to, or arranged to" can mean that the system comprises one or more components described herein as software modules, equivalent electronic hardware modules, or both to execute any referenced functions, mathematical operations, calculations, determinations, processes, methods, algorithms, subroutine.

Figure 1A:
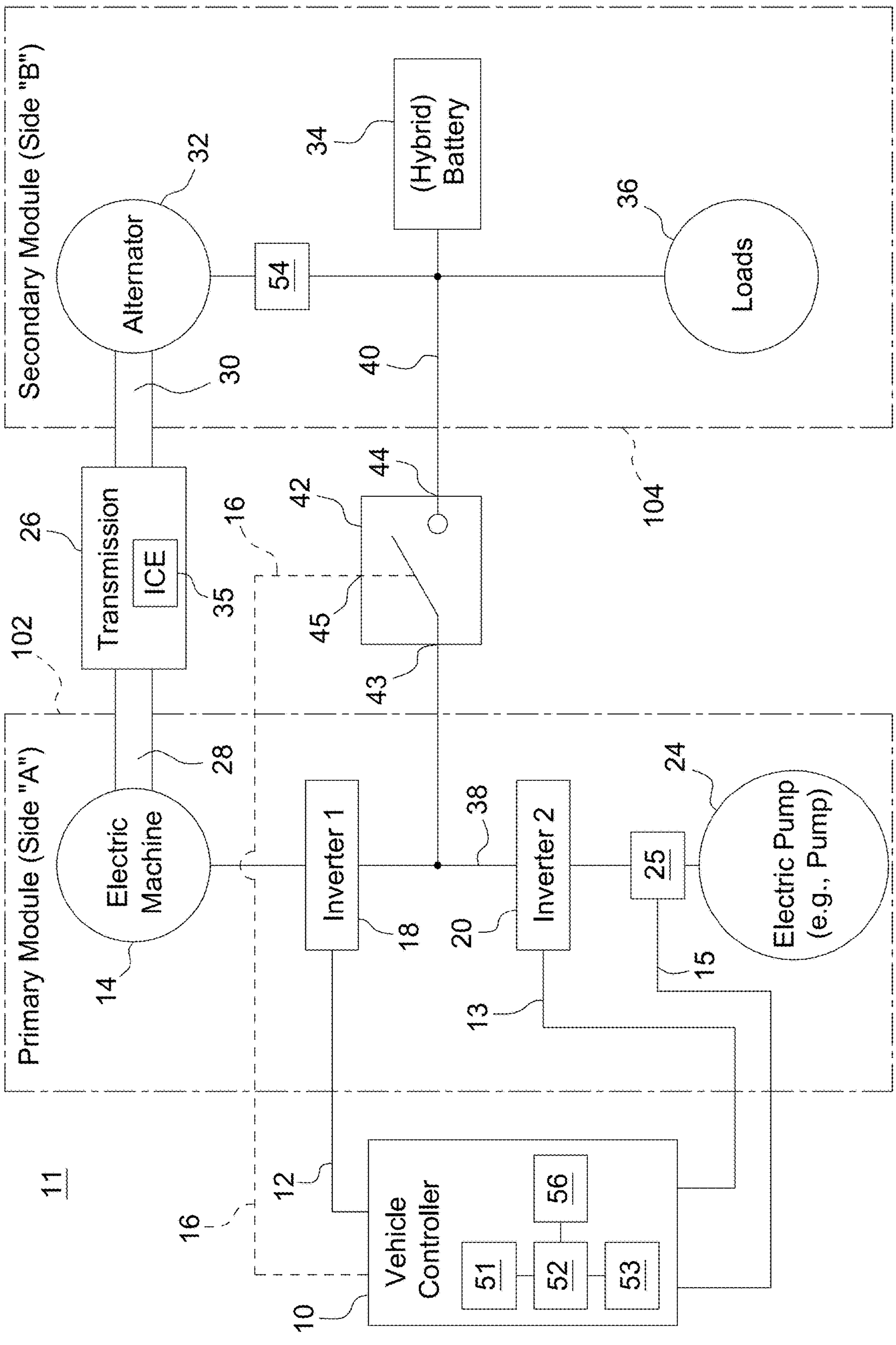
FIG. 1A is a block diagram of one embodiment of the control system or a hybrid vehicle with dual voltage direct current bus.

In accordance one embodiment, FIG. 1A illustrates a system 11 for a hybrid vehicle that comprises an internal combustion engine 35 configured to provide rotational energy via a rotatable engine shaft (and a transmission 26) to one or more electric machines comprising a first electric machine 14 and a second electric machine 32 (e.g., alternator or generator). The first electric machine 14 is synonymous with a primary electric machine; the second electric machine 32 is synonymous with a secondary electric machine.

A transmission 26 is configured to transmit the rotational energy between the engine shaft (e.g., crankshaft) and a primary shaft 28 or a secondary shaft 30 of the transmission 26, or to transmit the rotational energy between the engine shaft and both the primary shaft 28 and the secondary shaft 30 of the transmission 26. The transmission 26 has an engine interface shaft (e.g., engine input shaft) that can be coupled to or decoupled to the primary shaft 28, the secondary shaft 30, or both; the transmission 26 comprises a set of gears, and one or more clutches (e.g., mechanical, hydraulic, electromechanical, or electrohydraulic clutches) for selective coupling and decoupling of: (a) rotational energy between the engine interface shaft and the primary shaft 28, and/or (b) rotational energy between the engine interface shaft and the secondary shaft 30. A first electric machine 14 has a rotor coupled to the primary shaft 28 of the transmission 26 and a secondary machine has a rotor coupled to the secondary shaft 30 of the transmission 26 for the selective transfer of rotational energy of the internal combustion engine 35 to the first electric machine 14, the second electric machine 32, or both. The vehicle controller 10 may have a communications line (e.g., transmission line 15) that supports communication of control data, sensor data, state data, or other data (e.g., associated with a respective sensor 25) between the transmission 26 and the vehicle controller 10. In some embodiments, the vehicle controller 10 can control the selective transfer, coupling and decoupling of rotational energy by the transmission 26.

A first inverter 18 comprises a first alternating current node and a first direct current node, wherein the first alternating current node is coupled to the first electric machine 14 and wherein the first direct current node is coupled to a primary direct current bus. A second inverter 20 comprises a second alternating current node and a second direct current node, wherein the second alternating current node is coupled to an electrical load 24 and wherein the second direct current node is coupled to the primary direct current bus.

During a normal DC bus mode, the first DC node and the second DC node are configured to operate a lower voltage level on the primary direct current bus. In contrast, during a boost DC mode, the first DC node and the second DC node configured to operate a higher voltage level, which is higher than the lower voltage level, on the primary DC bus 38.

A rectifier 54 is coupled between electrical terminals of a second electric machine 32 and a secondary DC bus 40. An isolation switch 42 has switched terminals (43,44) connected between the primary DC bus 38 and the secondary DC bus 40. A sensor 25 is coupled to the second alternating current node to detect an observed current draw or an observed power consumption of the electrical load 24 during one or more sampling intervals. The sensor 25 may comprise one or more of the following: a current sensor, a voltage sensor, a power sensor, an arithmetic logic unit, a Boolean logic unit, a analog-to-digital converter, a low-pass filter, an integrator, an smoothing or averaging filter, or the like.

The vehicle controller 10 comprises an electronic data processor 51, a data storage device 53, and one or more data ports 56 that are coupled to a data bus 52. The electronic data processor 51, the data storage device 53 and the one or more data ports 56 may communicate with each other via the data bus 52. The data ports 56 support communications between the vehicle controller 10 and other modules illustrated in FIG. 1A via communication lines, conductors, twisted pairs, cables, wires, optical communications cable, or transmission lines (12, 13, 15, 16). For example, the communication lines, conductors, twisted pairs, cables, wires, optical communications cable, or transmission lines (12, 13, 15, 16) may comprise a vehicle data bus (e.g., controller area network (CAN) or Ethernet data bus).

Software instructions and data that are stored in the data storage device 53 may be executed by the data processor to implement any of the blocks, components or modules (e.g., electronic modules, software modules, or both) described in this disclosure document. The (electronic) data processor may comprise a microcontroller, a microprocessor, a programmable logic array (PLA), an application specific integrated circuit (ASIC), a digital signal processor, system 11 on a chip (SOC), or another device for processing data, manipulating, accessing, retrieving, and storing data. A data storage device 53 may comprise electronic member, non-volatile electronic memory, an optical storage device, a magnetic storage device, or another device for storing digital or analog data on a tangible storage medium, such as an optical disk, a magnetic disk, or electronic memory. Each data port 56 may comprise a buffer memory, a transceiver or both for interfacing with other network elements.

In accordance with one aspect of the disclosure, a vehicle controller 10 or an electronic data processor 51 is configured: (a) to change the switched terminals (43,44) of the isolation switch 42 to an open state (to a closed state) and (b) to generate a control signal for the inverters to operate in the DC boost mode if the electronic data processor 51 determines that the detected current draw exceeds a threshold current or that the detected power consumption exceeds a threshold power for one or more sampling intervals, such as over sampling intervals in which the detected power consumption is averaged or smoothed. In some configurations, the isolation switch 42 comprises a power switching transistor, where the switched terminals (43,44) comprise an emitter terminal and a collector terminal and where the control terminal 45 comprises a base or gate terminal that is coupled to the vehicle controller 10 via a transmission line 16 or a vehicle data bus. In other configurations, the isolation switch 42 comprises a field-effect power switching transistor, where the switched terminals (43,44) comprise an source terminal and a drain terminal and where the control terminal 45 comprises a gate terminal that is coupled to the vehicle controller 10 via a transmission line 16 or a vehicle data bus.

Figure 1B:
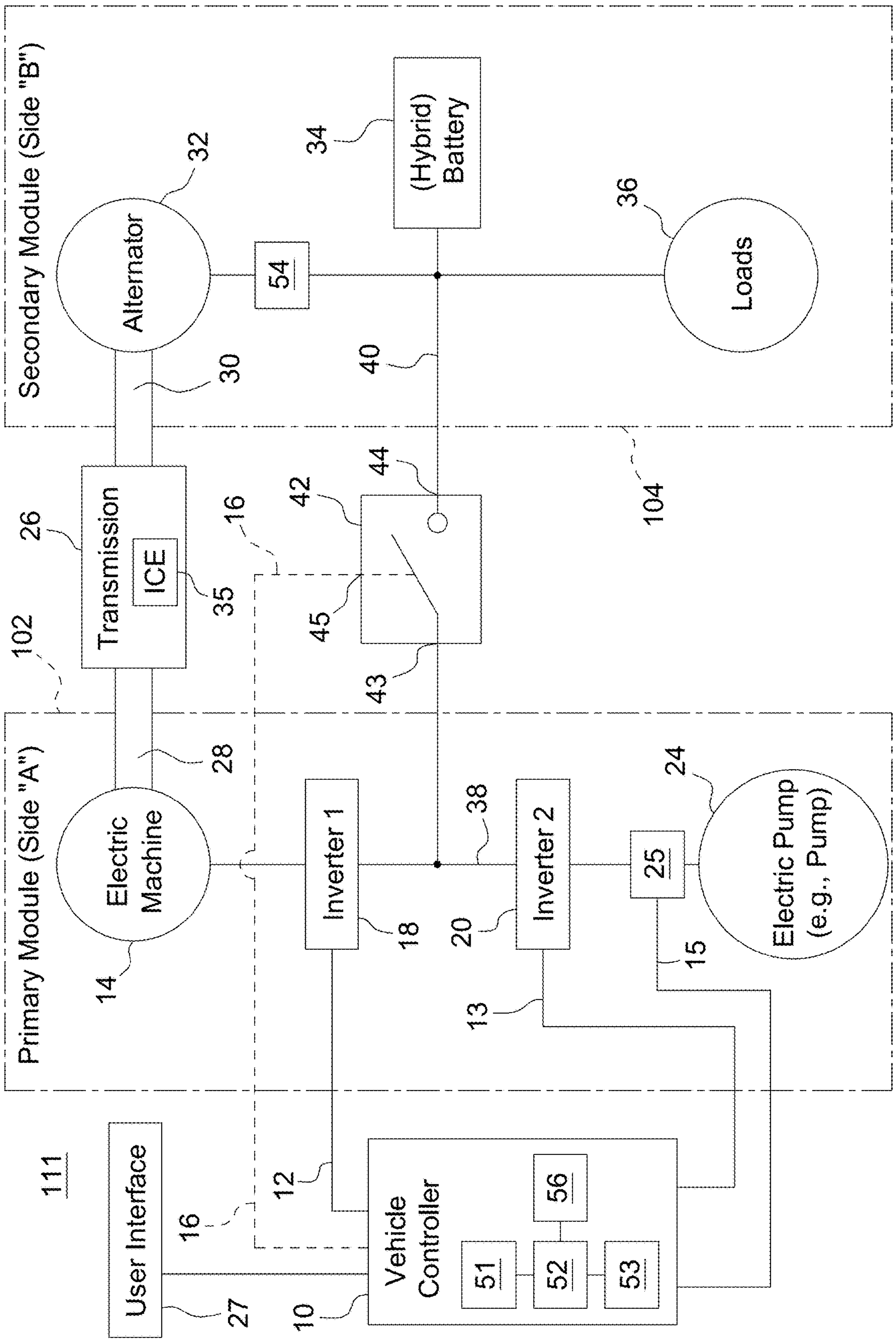
FIG. 1B is a block diagram of an alternate embodiment of the control system or a hybrid vehicle with dual voltage direct current bus.

In accordance with another aspect of the disclosure, which is illustrated in accordance with FIG. 1B, the control system 11 further comprises a user interface 27 coupled to the a vehicle controller 10 or an electronic data processor 51 is configured: (a) to change the switched terminals (43,44) of isolation switch 42 to an open state (from a closed state) and (b) to generate a control signal for the inverters to operate in the DC boost mode if the electronic data processor 51 determines that the operator of the vehicle entered or selected an application rate or aggregate flow rate for a sprayer implement that exceeds a threshold application rate or threshold flow rate.

A transmission 26 or gearbox is used to transmit rotational energy between the crankshaft of the engine and one or more shafts of the transmission 26, where the shafts may comprise a primary shaft 28, a secondary shaft 30 or both. However, in alternate embodiments, it is also possible to have use an engine that supports coupling on each side of the crankshaft or even to use an engine with a dual crankshaft configuration to replace the transmission 26, or in combination with the transmission 26.

In one embodiment, the first electric machine 14 comprises an alternating current electric machine that can operate as a motor in a motoring mode, a generator in a generating mode, or both. The first electric machine 14 is configured to operate in a generating mode to convert the rotational energy (e.g., convert and dissipate rotational energy for braking) to electrical energy at the first alternating current node. During the generating mode, the output of the first electric machine 14 is coupled to the first inverter 18 to rectify the alternating current to DC current applied to the primary DC bus 38.

To operate in the motoring mode and the generating mode at different times, the first electric machine 14 is coupled to a first inverter 18 than supports bi-directional operation. For example, first electric machine 14 is configured to operate in a motoring mode to converter electrical energy at the first alternating current node to rotational energy to rotate the primary shaft 28 of the transmission 26 (e.g., to augment the torque of the engine shaft (e.g., torque assist) or rotate the engine shaft).

In one embodiment, the second electric machine 32 comprises an alternator (or generator) for converting rotational energy to electrical energy at the secondary DC bus 40 to charge or maintain the battery 34, an ultracapacitor, supercapacitor, capacitor bank, or other electrical energy storage device. The second electric machine 32 comprises an alternator or generator. If the second electric machine 32 comprises an alternator, the electrical terminals of the alternator are coupled to a rectifier 54 that is configured to rectify or convert the alternating current to DC current at secondary DC bus 40.

In FIG. 1A or FIG. 1B, during a normal DC bus mode, the first DC node and the second DC node are configured to operate a lower voltage level on the primary direct current bus. In contrast, during a boost DC mode, the first DC node and the second DC node configured to operate a higher voltage level, which is higher than the lower voltage level, on the primary direct current bus. The voltage levels may be configured in accordance with various examples that may be implemented cumulatively, or separately. Under a first example, the lower voltage level is within a lower range between approximately 12 volts (DC) to approximately 60 volts (DC). As used throughout this document, "approximately" shall mean plus or minus ten percent or a tolerance of ten percent. Under a second example, the lower voltage level is within a lower range of approximately 48 volts (DC) to approximately 56 volts (DC). Under a third example, the higher voltage level is within a higher range between approximately 80 volts (DC) to approximately 120 volts (DC). Under a fourth example, the higher voltage level is approximately 96 volts (DC) (e.g., subject to a tolerance of ten percent).

In accordance with certain embodiments, as illustrated in FIG. 1A and FIG. 1B, a sensor 25 is coupled to the second alternating current node to detect an observed current draw or an observed power consumption of the electrical load 24 (e.g., an electrical pump for spraying crops, plants or soil) during one or more sampling intervals. The sensor 25 may be configured according to various techniques, which can be applied separately or cumulatively.

Under a first technique, the sensor 25 comprises a current sensor that is configured to sense an observed average current or an observed average current draw over a series of sampling intervals that meet or exceed a minimum time period, where average means a geometric mean, median or mode of the series of samples of observed current. The current sensor may comprise a current sensor that is coupled to a smoothing filter, or an integrator to determine an average current draw over a series of samples.

Under a second technique, the power sensor 25 comprises: (a) a current sensor that is configured to sense an observed average current or average current draw over a series of sampling intervals that meet or exceed a minimum time period, where average means a geometric mean, median or mode of the series of samples of observed current, and (b) a voltage sensor that is configured to sense an average voltage over a series of sampling intervals that meet or exceed a minimum time period, where average means a geometric mean, median or mode of the series of samples of observed voltage.

Under a third technique, the power sensor 25 comprises: (a) a current sensor that is configured to sense an observed average current or average current draw over a series of sampling intervals that meet or exceed a minimum time period, where average means a geometric mean, median or mode of the series of samples of observed current; (b) a voltage sensor that is configured to sense an average voltage over a series of sampling intervals that meet or exceed a minimum time period, where average means a geometric mean, median or mode of the series of samples of observed voltage; and (c) a logic device (e.g., digital logic, Boolean logic or an arithmetic logic unit of an electronic data processor 51) to multiply the current by the voltage for a respective minimum time period to estimate an observed power consumption.

Under a fourth technique, the current sensor 25 may be associated with a sampling device, a sample and hold device, or an analog-to-digital converter, which may function in conjunction with at a buffer memory, a data transceiver, or data transmitter in communication with a data port 56 of the vehicle controller 10 via a transmission line 15 or a vehicle data bus.

In one embodiment, the vehicle controller 10 comprises an electronic data processor 51 and a data storage device 53 that are coupled to a data bus 52 and are capable of communicating with each other. The data storage device 53 may store program instructions or software modules that are executable by or that can be run by the electronic data processor 51. The vehicle controller 10 or electronic data processor 51 may be programmed or configured in accordance with examples that may be applied separately or cumulatively.

Under a first example, via one or more software modules that are stored in the data storage device 53, the electronic data processor 51 or vehicle controller 10 is configured: (a) to maintain the isolation switch 42 in the closed state or to change the isolation switch 42 to an closed state (from an open state) by a control signal applied to a control terminal 45 (e.g., gate or base) of the isolation switch 42 (e.g., power transistor) and (b) to generate a control signal for the inverters to operate in the DC normal mode (e.g., for a series of present or next sampling intervals) if the electronic data processor 51 determines that the detected current draw is less than a threshold current or that the detected power consumption is less than a threshold power for one or more sampling intervals (e.g., present or past sampling intervals). As used throughout the disclosure, sampling interval is a measurement interval of the sensor 25, where the analog current waveform, analog the voltage waveform, or both may be sampled at sampling rate, which is usually at least twice the frequency (e.g., fundamental frequency of semiconductor switches within the first inverter 18, the second inverter 20 or both) of an alternating current signal.

Under a second example, via one or more software modules that are stored in the data storage device 53, the electronic data processor 51 or vehicle controller 10 is configured: (a) to maintain the isolation switch 42 in the open state or to change the isolation switch 42 to an open state (from a closed state) by a control signal applied to a control terminal 45 (e.g., gate or base) of the isolation switch 42 (e.g., power transistor) and (b) to generate a control signal for the inverters to operate in the DC boost mode (e.g., for a series of present or next sampling intervals) if the electronic data processor 51 determines that the detected current draw is greater than a threshold current or that the detected power consumption is greater than a threshold power (e.g., or greater than or equal to a threshold power) for one or more sampling intervals (e.g., present or past sampling intervals).

Under a third example, via one or more software modules that are stored in the data storage device 53, the electronic data processor 51 or vehicle controller 10 is configured: (a) after operating in the DC boost mode, to change the isolation switch 42 to return to a closed state for operating in the DC normal mode by a control signal applied to a control terminal 45 (e.g., gate or base) of the isolation switch 42 (e.g., power transistor) and (b) to generate a control signal for the inverters to operate in the DC normal mode if the electronic data processor 51 determines that the detected current draw is less than a threshold current or that the detected power consumption is less than a threshold power (e.g., or greater than or equal to a threshold power) for one or more sampling intervals. Further, the return to the closed state may be associated with a transitional delay between the DC normal mode and the DC boost mode, such as a hysteresis function in which the transitional delay can be configured to be asymmetrical depending upon whether the transition is from the DC normal mode to the DC boost mode, or from the DC boost mode to the DC normal mode. The transitional delay can be adjusted to avoid unwanted oscillation or instability between the DC normal and DC boost mode by requiring a first minimum number of sampling intervals to transition from the DC normal mode to the DC boost mode and a second minimum number of sampling intervals to transition from the DC boost mode to the DC normal mode.

In certain configurations, the isolation switch 42 is selected from the group of switches comprising a semiconductor switch, a power field effect transistor (FET), and insulated gate bipolar junction transistor, a relay, or another switching device. As illustrated in FIG. 1A and FIG. 1B, if or when the isolation switch 42 is in the open state, the primary DC bus 38 and the secondary DC bus 40 operate (or can operate) at different voltage levels (e.g., consistent with the DC boost mode). However, if or when the isolation switch 42 is in the closed state the primary DC bus 38 and the secondary DC bus 40 operate at the same voltage level (e.g., consistent with the DC normal mode). For example, when the isolation switch 42 is in the closed state the primary DC bus 38 and the secondary DC bus 40 operate at the lower voltage level (e.g., in the DC normal mode), wherein the first inverter 18 and the alternator, via the rectifier 54, can provide charging energy to charge or maintain the battery 34. Further, when the isolation switch 42 is in the closed state the primary DC bus 38 and the secondary DC bus 40 operate at the lower voltage level, wherein the second inverter 20 and its electrical loads (e.g., 24, 36) can draw stored DC energy from the battery 34 or other energy storage device.

In one embodiment, the electrical load 24 or loads on the primary DC bus 38 comprises one or more of the following: an electrical pump, an implement load, electric heater, window defroster, electronic display, climate control system, a compressor, electrical power steering, an actuator, or another electrical load.

The system 111 of FIG. 1B is similar to the system 11 of FIG. 1A, except the system 11 of FIG. 1B further comprises the user interface 27 that is coupled to the vehicle controller 10 or its data bus 52, or a data port 56 that coupled to the data bus 52 of the vehicle controller 10. Like reference numbers in FIG. 1A and FIG. 1B indicate like elements, features or blocks.

The user interface 27 may comprise one or more of the following: an electronic display, a liquid crystal electronic display, a keypad, a keyboard, a set of switches, an electronic pointing device (e.g., trackball or electronic mouse), or other electronic or electromechanical devices that can facilitate the input, output, entering, selection and processing of data.

Further, in FIG. 1B the software instructions or software modules within the data storage device 53 of the vehicle controller 10 can be different than in FIG. 1A. The vehicle controller 10 or electronic data processor 51 may be programmed or configured in accordance with examples that may be applied separately or cumulatively.

In a first example, in FIG. 1B a vehicle controller 10 or electronic data processor 51 is configured: (a) to change the isolation switch 42 to an open state and (b) to generate a control signal for the inverters to operate in the DC boost mode if the electronic data processor 51 determines that the operator, via the user interface 27, selects or enters an application rate that is: (1) greater than a threshold application rate of spraying, or (2) greater than a peak threshold application rate (e.g., expressed in gallons/acre or liters/hectare), or (3) greater than an aggregate nozzle flow rate of sprayer nozzles, where the sprayer is associated with an electrical load 24, such as an electrical pump, that is energized by alternating current or electrical energy provided by the second inverter 20.

In a second example, in FIG. 1B a vehicle controller 10 or electronic data processor 51 is configured: (a) to change the isolation switch 42 to an closed state and (b) to generate a control signal for the inverters to operate in the DC normal mode if the electronic data processor 51 determines that the operator, via the user interface 27, selects or enters an application rate that is: (1) less than a threshold application rate of spraying, or (3) less than a peak threshold application rate (e.g., expressed in gallons/acre or liters/hectare), or (3) less than an aggregate nozzle flow rate of sprayer nozzles, where the sprayer is associated with an electrical load 24, such as an electrical pump, that is energized by alternating current or electrical energy provided by the second inverter 20.

In a third example, in FIG. 1B a vehicle controller 10 or electronic data processor 51 is configured: (a) to change (or revert back) the isolation switch 42 to an closed state and (b)

to generate a control signal for the inverters to operate in the DC normal mode after a maximum pre-established time period of operating in the DC boost mode or after entry or selection of an application rate that exceeded a threshold application rate.

In a fourth example, in FIG. 1B a vehicle controller 10 or electronic data processor 51 is configured: (a) to change (or revert back) the isolation switch 42 to an closed state and (b) to generate a control signal for the inverters to operate in the DC normal mode if the electronic data processor 51 determines: (1) that electrical load 24 (e.g., of the electrical pump) or sensor 25 is drawing less than a threshold current or that the detected power consumption is less than a threshold power (e.g., or greater than or equal to a threshold power) for one or more sampling intervals.

Figure 2:
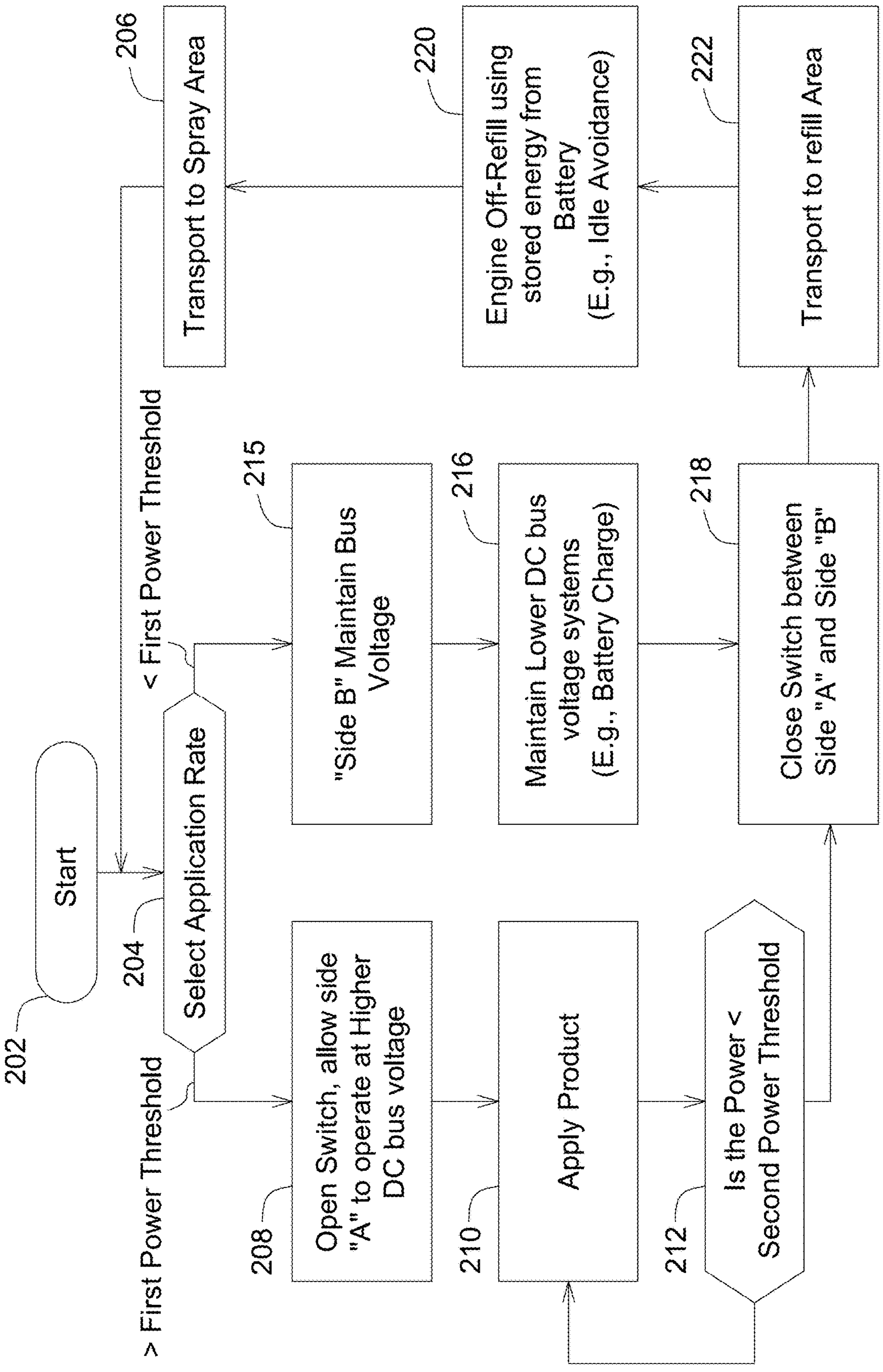
FIG. 2 is a flow chart of one embodiment of the control method for a hybrid vehicle with dual voltage direct current bus.

FIG. 2 illustrates a method of controlling a hybrid vehicle with dual voltage direct current bus. The method of FIG. 2 starts in step 202.

In step 204, firstly, the operator selects or enters, via the user interface 27, an application rate for the sprayer or sprayer implement of the off-road hybrid vehicle; secondly, the vehicle controller 10 or electronic data processor 51 determines whether the selected or entered application rate is less than or greater than a threshold application rate (e.g., first power threshold). The threshold application rate may correspond to a first power threshold or an equivalent electrical power required for the respective threshold application rate. Via the user interface 27, the operator or end user may select or enter an application rate, which is expressed in gallons per unit time, gallons per acre, liters per unit time, or liters per hectare, among other possibilities. If the vehicle controller 10 or electronic data processor 51 determines that the selected or entered application rate (in step 204) is greater than a threshold application rate (e.g., which corresponds to the first power threshold), then the method continues with step 208. However, if the vehicle controller 10 or electronic data processor 51 determines that the selected or entered application rate (in step 204) is less than the threshold application rate (e.g., which corresponds to the first power threshold), then the method continues with step 215.

In step 208, the vehicle controller 10 or electronic data processor 51 maintains, sets, or changes the isolation switch 42 to an open state, which allows the primary DC bus 38 to operate at a higher DC bus voltage or boost DC bus voltage (e.g., than the secondary DC bus 40). Further, the primary DC bus 38 may be associated with a primary module 102, which is also referred to as side A of the system 11.

In step 215, the vehicle controller 10 or electronic data processor 51 maintains, sets, or changes the isolation switch 42 to a closed state, which allows the lower DC bus voltage or normal DC bus voltage to be available at the primary DC bus 38 and the secondary DC bus 40. Further, the second DC bus may be associated with a secondary module 104, which is also referred to as side B of the system 11.

Step 210 follows step 208. In step 210, the vehicle controller 10 and electronic data processor 51 support the operation of the electrical load 24 or electrical pump of the sprayer or sprayer implement to apply the crop treatment (e.g., product) to the crop, seed, plants, soil, or foliage in accordance with the application rate that is greater than the threshold application rate (e.g., greater than a first power threshold). Further, a higher DC bus voltage or boost DC bus voltage is available at the primary DC bus 38 and the DC node (e.g., DC terminals of) second inverter 20; in turn, the second inverter 20 can provide alternating current signals/energy at the alternating current node to the electrical load 24 or electrical pump, where the alternating current signal is generally matched to the load demand (e.g., greater than a first power threshold) placed on the electrical load (24, 36), such as the electrical pump for the respective spraying task. The higher DC bus voltage 38 supports greater available power capacity or available electrical power for the second inverter 20 to apply to the electrical load 24 (e.g., electrical pump for spraying tasks, where the pressure of the pumped fluid and/or the flow rate of the pumped fluid is within an elevated range for one or more successive sampling intervals).

Step 216 follows step 215. In step 216, the vehicle controller 10 and electronic data processor 51 support the operation of the electrical load 24 or electrical pump of the sprayer or sprayer implement to apply the crop treatment (e.g., product) to the crop, seed, plants, soil, or foliage in accordance with the application rate that is less than the threshold application rate (e.g., less than a first power threshold). Further, a lower DC bus voltage or normal DC bus voltage is available at the primary DC bus 38 and the DC node (e.g., DC terminals of) second inverter 20 (e.g., where the lower DC bus voltage is also available at the secondary bus for the electrical load 36); in turn, the second inverter 20 can provide alternating current signals/energy at the alternating current node to the electrical load 24 or electrical pump, where the alternating current signal is generally matched to the load demand (e.g., less than the first power threshold) placed on the electrical load (24, 36; e.g., electrical pump) for the respective spraying task (e.g., electrical pump for spraying tasks, where the pressure of the pumped fluid and/or the flow rate of the pumped fluid is within a reduced range or normal range for one or more successive sampling intervals). For example, in step 216, the vehicle controller 10 and electronic data processor 51 is configured to maintain the lower DC bus voltage or normal DC bus voltage on the primary DC bus 38 and the second DC bus 40, which supports battery charging or recharging of the battery 34 at a greater amperage via both the first inverter 18 (e.g., if the first electric machine 14 operates in the power generating mode) and the rectifier 54.

Step 212 follow step 210. In step 212, the vehicle controller 10 or electronic data processor 51 determines whether the demanded power is less than an electrical power threshold (e.g., less than second power threshold). If the demanded power is greater than or equal to the second power threshold, then the vehicle controller 10 or electronic data processor 51 continues operation at the higher DC bus voltage or boost DC bus voltage (on the primary DC bus 38) and returns to step 210 (e.g., after incrementing a counter, incrementing a sampling interval, or waiting for one or more sampling intervals). However, if the demanded power is less than the second power threshold, then the vehicle controller 10 or electronic data processor 51 transitions from the higher DC bus voltage (e.g., on the primary DC bus 38) to the lower DC bus voltage by continuing with step 218.

In step 218, the vehicle controller 10 or electronic data processor 51 determines to close the switch between primary DC bus 38 and the secondary DC bus 40 to operate at the lower DC bus voltage or normal DC bus voltage. Accordingly, both the primary module 102 (e.g. of side A) and the secondary module 104 (e.g., of side B) operate at the lower DC bus voltage or normal DC bus voltage (e.g., at the secondary DC bus 40).

In step 222, the vehicle controller 10 or electronic data processor 51 determines that the sprayer tank is approaching or below a lower limit or refilling level that requires refilling of the sprayer tank. Therefore, the vehicle controller 10 or electronic data processor 51 establishes a path plan, mission or task for the vehicle (e.g., which houses or carries the system, 11, 111) or sprayer to travel to a refilling zone or refilling area.

In step 220, the vehicle controller 10 or electronic data processor 51 is configured to control the internal combustion engine 35 to be in an off state (e.g., to avoid idling and consuming fuel during idling) during refilling or while the vehicle is in the refilling zone or refilling area; further, to refill the sprayer tank (e.g., associated with the vehicle that houses or carries system 11, 111) by using stored energy from the battery 34 or another energy storage device. For example, the vehicle controller 10 or electronic data processor 51 may be coupled to a location-determining receiver, such as a Global Navigation System 11 Satellite (GNSS) receiver to provide location data (e.g., geographic coordinates) to determine whether or not the vehicle is in the refilling zone or refilling area. After or once the sprayer tank reaches an upper limit (e.g., full state), the method continues with step 206.

In step 206, the vehicle controller 10 or electronic data processor 51 is configured to guidance or control the vehicle in accordance with a path plan or guidance path that transports or directs the vehicle between the refilling zone and the spraying zone or spraying area.

Figure 3A:
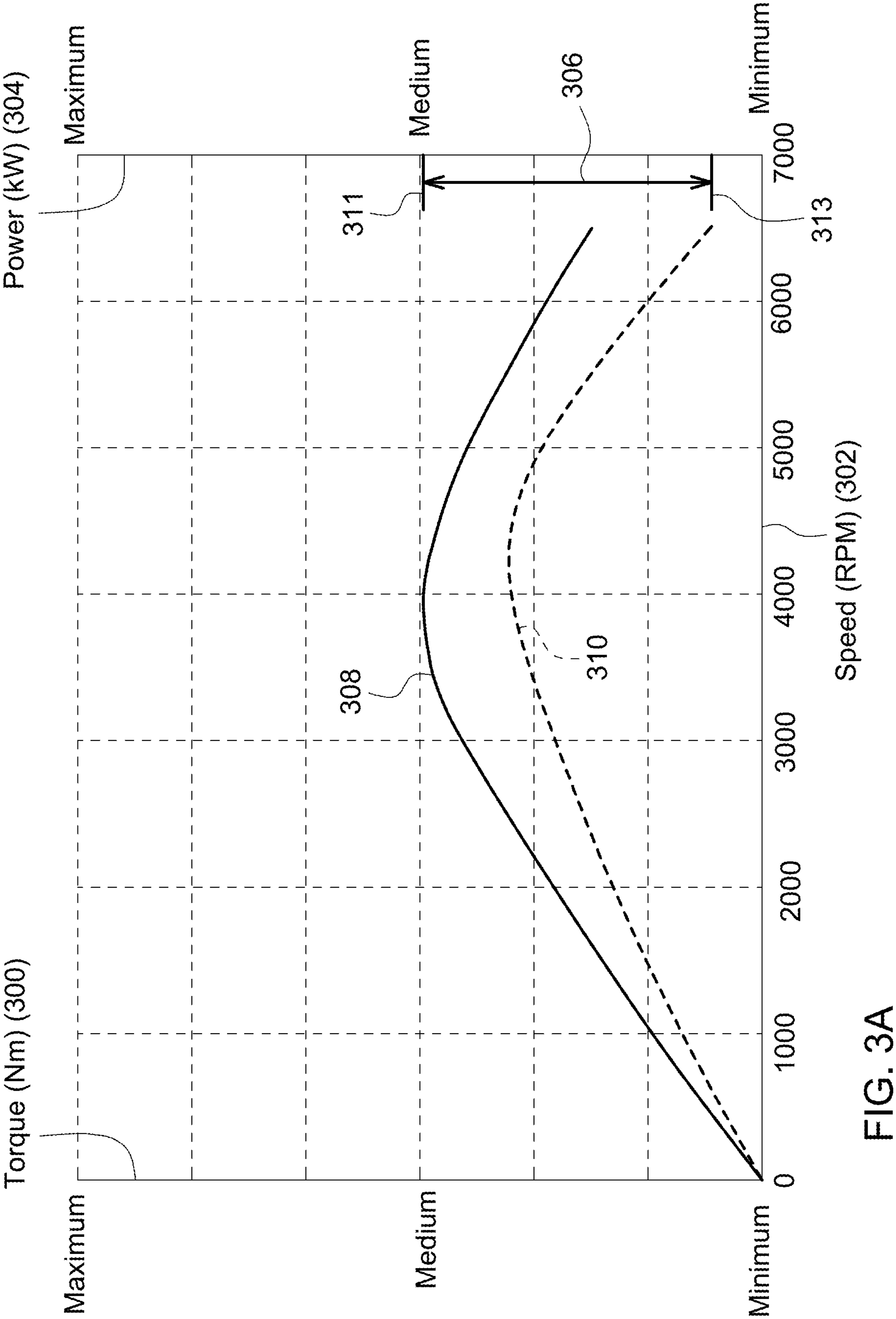
FIG. 3A illustrates one example of a torque versus speed curve for an illustrative electric motor operating a lower DC voltage bus level that is lower than a higher DC voltage bus level of FIG. 3B.
Figure 3B:
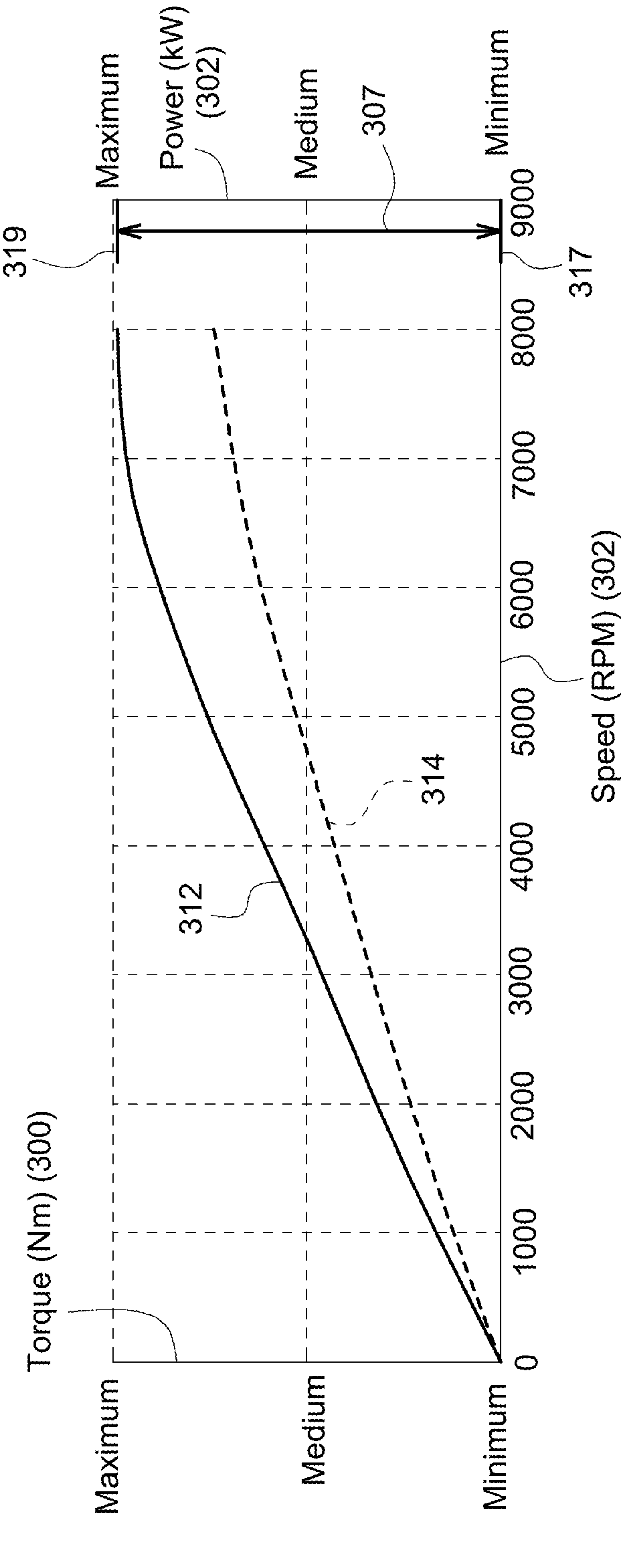
FIG. 3B illustrates one example of a torque versus speed curve for an illustrative electric motor operating a higher DC voltage bus level that is higher than a lower DC voltage bus level of FIG. 3B.

FIG. 3A illustrates several examples of a torque versus speed curves (308, 310) for one or more illustrative electric machines (e.g., 14) operating a lower DC voltage bus level on the primary DC bus 38 that is lower than a higher DC voltage bus level or boost DC bus voltage level of FIG. 3B. With respect to the performance of the first electric machine 14, the left vertical axis of FIG. 3A represents torque 300, whereas the right vertical axis represents electrical power 304, where a first power range 306 extends from a minimum power level 313 to an intermediate or medium power level 311. Meanwhile, the horizontal axis shows rotational speed 302 of the first electric machine 14. Torque 300 may be expressed in units of Newton-meters (Nm); electrical power 304 may be expressed in units of Kilowatts (kW) of the respective electric machine (14, 32); rotational speed 302 may be expressed in units of revolutions per minute (RPM) of the respective electric machine (14, 32). In FIG. 3A in the normal DC mode, consistent with the first power range 306 the torque versus speed of the first electric machine 14 can provide or support minimum to medium power draw or power consumption (e.g., from the minimum power level 313 to the medium power level) for the electrical load 24 (e.g., electrical pump).

In FIG. 3A, the first electric machine 14 is operated at normal DC bus voltage or lower DC bus voltage of the primary DC bus 38 and secondary DC bus 40, the upper torque-speed curve 308 is illustrated as a solid curve of torque 300 versus speed 302. The upper torque-speed curve 308 of FIG. 3A supports the first power range 306 throughout the speed range of the first electric machine 14 that is lower in comparison to the second power range 307 of upper torque-speed curve 312 of FIG. 3B, which is illustrated as a solid curve of torque 300 versus speed 302. Similarly, at the normal DC bus voltage or lower DC bus voltage of the primary DC bus 38 and secondary DC bus 40, the lower torque speed-curve 310 of FIG. 3A is dashed curve of torque 300 versus speed 302. The lower torque-speed curve 310 of FIG. 3A supports first power range 307 levels throughout the speed 302 range of the first electric machine 14 that is lower in comparison to lower torque-speed curve 314 of FIG. 3B, which is illustrated as the dashed curve of torque 300 versus speed 302.

In FIG. 3A and FIG. 3B, the upper-torque speed curves (308, 312) are associated with a first configuration of the first electric machine 14 that is associated with a respective further characterization of a torque 300 versus speed 302 curve, or a set of first electric machines 14 that are coupled to the primary DC bus 38. Meanwhile, in FIG. 3A and FIG. 3B, the lower-torque speed curves (310, 314) are associated with a second configuration of the electric machine (e.g., 14, 32) that is associated with a respective further characterization of a torque 300 versus speed 302 curve, or a set of first electric machines 14 that are coupled to the primary DC bus 38. In one embodiment, the first electric machine 14 provides rotational energy to the primary DC bus 38 that is available to the second inverter 20 and electrical load 24 (e.g., electrical pump) in accordance with one or more torque-speed curves (308, 310, 312, 314), where any DC storage device, such as a battery 34, ultracapacitor or supercapacitor can be configured to optimize the electrical power 304 supply to the electrical load 24 (e.g., electrical pump.)

FIG. 3B illustrates examples of torque-speed curves (312, 314) for an illustrative electric motor operating a higher DC voltage bus level or DC boost mode that is higher than a lower DC voltage bus level of FIG. 3A. Like reference numbers in FIG. 3A and FIG. 3B indicate like elements, features or processes. In FIG. 3B in the boost DC mode, the torque-speed curves (312, 314) of the first electric machine 14 can provide minimum to maximum power draw or power 304 consumption for the electrical load 24 or electrical pump in accordance with the second power range 307.

The left vertical axis of FIG. 3B represents torque 300, whereas the right vertical axis represents electrical power 304. Meanwhile, the horizontal axis shows rotational speed 302 of the first electric machine 14. Torque 300 may be expressed in units of Newton-meters (Nm); electrical power 304 may be expressed in units of Kilowatts (kW); speed 302 may be expressed in units of revolutions per minute (RPM).

Advantageously, in certain embodiments, as illustrated in FIG. 3B, the first electric machine 14 is configured to operate a second power output range 307 associated with a greater speed range at the higher DC bus voltage than the lower DC bus voltage to provide a corresponding greater torque 300 and respective speed 302 over the greater speed range. Further, in FIG. 3B the second power range 307 extends from minimum power level 317 to a maximum power level 319; the speed range of the speed 302 extends from zero to approximately 8,000 revolutions per minute.

Meanwhile, in certain embodiments, as illustrated in FIG. 3A the first electric machine 14 is configured to operate a first power range 306 associated with a lower speed range at the lower DC bus voltage than a higher DC bus voltage or boost DC bus voltage; where the first power range 306 provides a corresponding greater efficiency within a mid-range band of speed 302 where the respective speed 302 and respective torque 300 are a local or global maxima for lower DC bus voltage. As illustrated in FIG. 3A, the first power range 306, which has less energy consumption than the second power range 307, extends from a minimum power level 313 to a medium power level 311, and the speed range can be efficient at a mid-band speed range (e.g., approximately 3,000 to approximately 5,000 revolutions per minute of the rotor shaft of the electric machine 14).

In some embodiments, at the lower DC bus voltage or normal DC bus voltage of the normal DC bus mode, the first electric machine 14 is not thermally stable and the duty cycle tends to derate the performance of the first electric machine 14. However, at the higher DC bus voltage or boost DC bus voltage of the DC boost mode, the first machine 14 becomes thermally stable and can operate at higher power levels 302 for longer periods of time.

Although certain embodiments of a control system and method for a hybrid vehicle with dual voltage direct current bus have been described in this disclosure, the scope of the coverage of this disclosure may extend to variants of the systems, methods, processes, examples, systems and concepts disclosed herein. For example, in any patent that may be granted on this disclosure, one or more claims can cover equivalents and variants to the full extent permitted under applicable law, among other things.

The following is claimed:

1. A control system for a hybrid vehicle comprising:

an internal combustion engine configured to provide rotational energy via a rotatable engine shaft to one or more electric machines comprising a first electric machine and a second electric machine;

a transmission configured to transmit the rotational energy between the engine shaft and a primary shaft or a secondary shaft, or to transmit the rotational energy between the engine shaft and both the primary shaft and the secondary shaft;

a primary electric machine having a rotor coupled to the primary shaft;

a secondary electric machine having a rotor coupled to the secondary shaft;

a first inverter comprising a first alternating current node and a first direct current (DC) node, wherein the first alternating current node is coupled to the primary electric machine and wherein the first direct current node is coupled to a primary direct current bus;

a second inverter comprising a second alternating current node and a second direct current node, wherein the second alternating current node is coupled to an electrical load and wherein the second direct current node is coupled to the primary direct current bus;

during a normal DC bus mode, the first DC node and the second DC node configured to operate a lower voltage level on the primary direct current bus;

during a boost DC mode, the first DC node and the second DC node configured to operate a higher voltage level that is higher than the lower voltage level;

a rectifier coupled between electrical terminals of the secondary electric machine and a secondary DC bus;

an isolation switch having switched terminals connected between the primary DC bus and the secondary DC bus;

a sensor coupled to the second alternating current node to detect a current draw or power consumption sample of the electrical load during one or more sampling intervals; and a vehicle controller or electronic data processor configured: (a) to change the isolation switch to an open state and (b) to generate a control signal for the inverters to operate in the DC boost mode if the electronic data processor determines that the detected current draw exceeds a threshold current or that the detected power consumption exceeds a threshold power.

2. The control system according to claim 1 wherein the first electric machine is configured to operate in a generating mode to convert the rotational energy to electrical energy at the first alternating current node; wherein the rectifier is configured to rectify alternating current to DC current at the first DC node for the primary DC bus.

3. The control system according to claim 1 wherein the secondary electric machine comprises an alternator for converting rotational energy to electrical energy at the secondary DC bus to charge or maintain a battery.

4. The control system according to claim 1 wherein the first electric machine is configured to operate in a motoring mode to convert electrical energy at the first alternating current node to rotational energy to rotate the primary shaft of the transmission.

5. The control system according to claim 1 wherein the lower voltage level is within a lower range between approximately 12 volts to 60 volts.

6. The control system according to claim 1 wherein the lower voltage level is approximately 48 to 56 volts.

7. The control system of claim 1 wherein the higher voltage level is within a higher range between approximately 80 to 120 volts.

8. The control system according to claim 1 wherein the higher voltage level is approximately 96 volts.

9. The control system according to claim 1 wherein the sensor comprises a current sensor that is configured to sense an average current or average current draw over a series of sampling intervals that meet or exceed a minimum time period.

10. The control system according to claim 1 wherein the sensor comprises a current sensor that is configured to sense an average current or average current draw over a series of sampling intervals that meet or exceed a minimum time period and a voltage sensor that is configured to sense an average voltage over a series of sampling intervals that meet or exceed a minimum time period, and a logic to multiply the current by the voltage for a respective minimum time period to estimate an observed power consumption.

11. The control system according to claim 1 wherein the electronic data processor or vehicle controller is configured: (a) to change the isolation switch to a closed state and (b) to generate a control signal for the inverters to operate in the DC normal bus mode if the electronic data processor determines that the detected current draw is less than a threshold current or that the detected power consumption is less than a threshold power.

12. The control system according to claim 1 wherein the isolation switch is selected from the group of switches comprising a semiconductor switch, a power field effect transistor, an isolated gate bipolar junction transistor, a relay, or another switching device.

13. The control system according to claim 1 wherein when the isolation switch is in a closed state the primary DC bus and the secondary DC bus operate at the same voltage level.

14. The control system according to claim 1 wherein when the isolation switch is in the open state the primary DC bus and the secondary DC bus operate at different voltage levels.

15. The control system according to claim 1 wherein when the isolation switch is in a closed state the primary DC bus and the secondary DC bus operate at the lower voltage level, wherein the first inverter and an alternator, via the rectifier, can provide charging energy to charge or maintain a battery.

16. The control system according to claim 1 wherein when the isolation switch is in a closed state the primary DC bus and the secondary DC bus operate at the lower voltage level, wherein the second inverter and its electrical load can draw stored DC energy from a battery.

17. The control system according to claim 1 wherein the electrical load comprises a pump.

18. The control system according to claim 1 wherein the first electric machine is configured to operate a greater speed range at the higher voltage level than the lower voltage level to provide a corresponding greater torque and respective speed at the greater speed range.

19. The control system according to claim 1 wherein the first electric machine is configured to operate a lower speed range at the lower voltage level than the higher voltage level to provide a corresponding greater efficiency within a mid-range band of speed where a respective speed and a respective torque are a local or global maxima for lower DC bus voltage.

20. A control system for a hybrid vehicle comprising:

an internal combustion engine configured to provide rotational energy via a rotatable engine shaft to one or more electric machines comprising a first electric machine and a second electric machine;

a transmission configured to transmit the rotational energy between the engine shaft and a primary shaft or a secondary shaft, or to transmit the rotational energy between the engine shaft and both the primary shaft and the secondary shaft;

a primary electric machine having a rotor coupled to the primary shaft;

a secondary electric machine having a rotor coupled to the secondary shaft;

a first inverter comprising a first alternating current node and a first direct current (DC) node, wherein the first alternating current node is coupled to the primary electric machine and wherein the first direct current node is coupled to a primary direct current bus;

a second inverter comprising a second alternating current node and a second direct current node, wherein the second alternating current node is coupled to an electrical load and wherein the second direct current node is coupled to the primary direct current bus;

during a normal DC bus mode, the first DC node and the second DC node configured to operate a lower voltage level on the primary direct current bus;

during a boost DC mode, the first DC node and the second DC node configured to operate a higher voltage level that is higher than the lower voltage level;

a rectifier coupled between electrical terminals of the secondary electric machine and a secondary DC bus;

an isolation switch having switched terminals connected between the primary DC bus and the secondary DC bus;

a sensor coupled to the second alternating current node to detect a current draw or power consumption sample of the electrical load during one or more sampling intervals; and a vehicle controller or electronic data processor configured: (a) to change the isolation switch to an open state and (b) to generate a control signal for the inverters to operate in the DC boost mode if the electronic data processor determines that an operator of the vehicle entered or selected an application rate or aggregate flow rate for a sprayer implement that exceeds a threshold application rate or threshold flow rate.

* * * * *